Oct. 1, 1968

A. G. LARSON ET AL 3,403,570

ANTIREVERSE MOTOR

Filed Feb. 13, 1967

INVENTOR.
ARTHUR G. LARSON
DONALD D. DAY
BY Merchant & Gould
ATTORNEYS

INVENTOR.
ARTHUR G. LARSON
DONALD D. DAY
BY Merchant & Gould
ATTORNEYS

United States Patent Office 3,403,570
Patented Oct. 1, 1968

3,403,570
ANTIREVERSE MOTOR
Arthur G. Larson, Mound, and Donald D. Day, Minneapolis, Minn., assignors to McQuay, Inc., Minneapolis, Minn., a corporation of Minnesota
Filed Feb. 13, 1967, Ser. No. 615,608
6 Claims. (Cl. 74—411.5)

ABSTRACT OF THE DISCLOSURE

An antireverse motor having a metal plate with a plurality of apertures mounted in fixed position relative to the motor drive shaft, and a pivotal ratchet that rotates with the motor drive shaft, the ratchet being held out of engagement with the plate when the motor rotates in a forward direction and in engagement with the portion of the plate defining one of the apertures when the motor stops or tends to rotate in a reverse direction.

Background of the invention

The present invention pertains to electric motors in general, and more specifically to electric motors which include mechanisms for preventing the motor from rotating in a reverse direction.

Antireverse motors are known in the prior art. For example, shaded pole motors have used an anti-reverse device wherein a plate having a plurality of raised sawtooth-like teeth thereon is mounted on the external casing of the motor coaxially with the motor shaft. A pair of pivoted arms are connected to the drive shaft for rotation therewith. As the motor rotates in a forward direction, the pivoted arms ride up the inclined portion of the sawtooth-like teeth, and when the motor has attained a sufficient rotational velocity, the pivoted arms are held in a raised position by means of centrifugal force. If the motor stops or tends to rotate in a reverse direction, the pivoted arms drop under the force of gravity when the motor slows or stops, and as the motor tends to reverse, the pivoted arms engage the raised sawtooth-like portion of the plate and prevent reverse rotation of the motor.

However, the above-described prior art structure suffers from several serious disadvantages. One is that since the pivoted arms must clear the raised teeth during rotation, the overall axial space required by the antireverse mechanism is relatively large. In addition, since this structure is mounted external to the motor, it further requires an additional housing to enclose the mechanism, otherwise the mechanism constitutes a safety hazard. Further, in operation, and particularly after wearing of the drive shaft bearings, there develops an axial end play of the shaft so that the shaft will move back and forth axially, and the pivoted arms will strike the tops of the raised sawtooth teeth, even during rotation. This results in a noisy and, therefore, objectionable motor.

Further, in split phase motors, the end of the drive shaft is not accessible from outside the motor, and hence, it is impossible to use the above-described type of antireverse mechanism with a split phase motor. Furthermore, the above-described prior art mechanism cannot be mounted inside the motor, first of all, because it requires excessive space, and secondly, because mounting the plate with raised teeth internal of the motor would interfere with the circulation of cooling air through the motor, whereby causing the motor to overheat.

Summary of the invention

In the present invention, the antireverse mechanism is mounted inside of the motor housing, and therefore the present invention can be utilized with either a shaded pole of a split phase motor. The present invention utilizes a ratchet and stop plate internally mounted within the motor. The stop plate is mounted in a fixed position relative to the motor housing, while the ratchets are attached at equal spacing to the motor fan blade carrier plate, and are pivoted and balanced to be in a vertical or "stop" position by gravitational force when the motor is stopped, or when the motor attempts to run in a reverse direction. The stop plate has a plurality of staggered apertures therethrough, the apertures being beneath the pivoted ratchet members. The ratchets are further shaped in a generally U-shape, with the U opening in the direction of forward rotation so that as the ratchets rotate with the fan blade, the ratchet pivots up to a carrying position underneath the fan blade carrier plate due to the air flow over the base of the U-shaped ratchet, and also by centrifugal force of the rotating fan carrier. If the motor stops, or tends to rotate in the opposite direction, the ratchet pivots from its "carrying" position to a "stop" position by gravitational force, the ratchet dropping into one of the staggered apertures in the stop plate, thereby preventing the motor from rotating in a reverse direction.

Since the present invention utilizes a stop plate having a plurality of apertures therethrough, the stop plate can be mounted inside of the motor housing without interfering with the air flow through the motor housing. In addition, since the ratchet engages with a portion of the stop plate defining one of the apertures, and since the ratchet can be pivotally mounted to the motor fan blade carrier plate, the antireverse mechanism of the present invention can be constructed in a relatively small space. In addition, the U-shaped construction of the ratchet provides an additional means for holding the ratchet out of engagement with the stop plate during forward rotation of the motor; that is, the ratchet acts as a "scoop," and air pressure holds the ratchet in an upwardly pivoted position out of engagement with the stop plate.

It is one object of the present invention, therefore, to provide an improved antireverse motor. It is another object of the present invention to provide an improved antireverse motor wherein a ratchet member engages a portion of a stop plate when the motor tends to rotate in a reverse direction, and wherein the ratchet is held out of engagement with the stop plate by centrifugal force and by air pressure when the motor rotates in a forward direction.

A further object of the invention is to provide an antireverse motor wherein the antireverse mechanism is mounted inside the motor housing.

These and other objects of our invention will become apparent to those skilled in the art upon consideration of the accompanying specification, claims, and drawings.

Brief description of the drawings

Referring to the drawings, wherein like numerals represent like parts throughout the several views.

Description of the preferred embodiment

Figure 1:
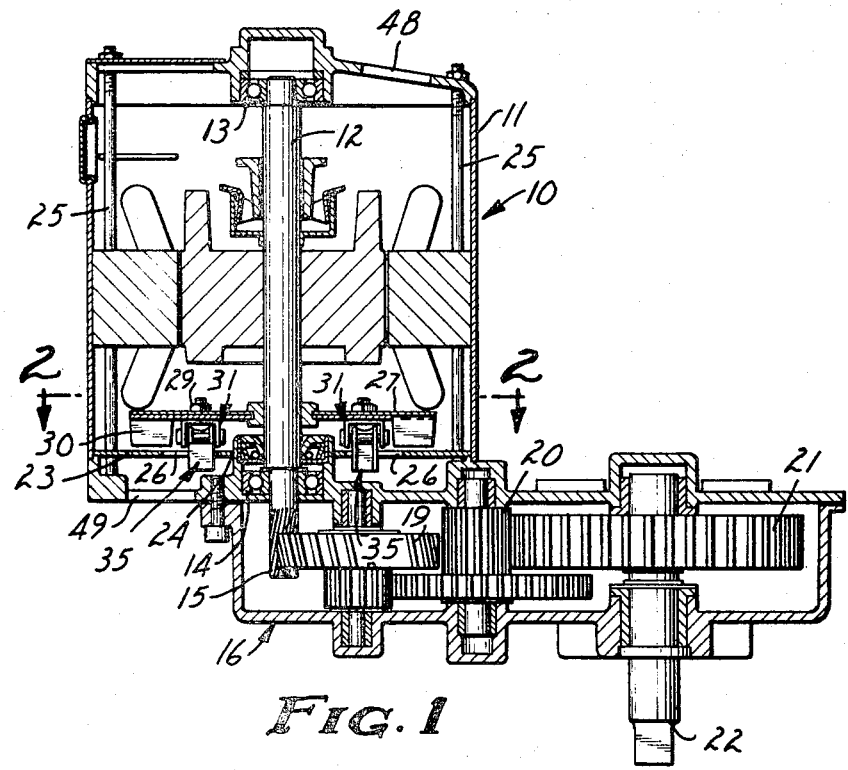
FIG. 1 is an axial section showing an embodiment of the present invention.
Figure 2:
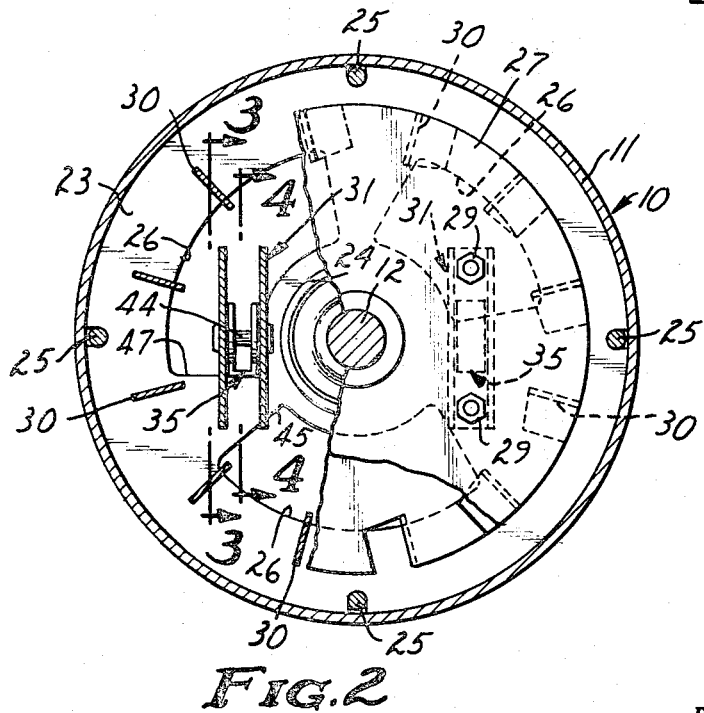
FIG. 2 is an enlarged sectional view taken along line 2—2 of FIG. 1, parts thereof being broken away.

Referring to the drawings, there is shown a motor 10 having a housing 11. Since motor 10 is of a conventional design, being shown as a split phase motor, with the exception of the antireverse mechanism, the motor 10 will not be discussed in detail.

Motor 10 has a vertically mounted drive shaft 12 which is rotatably mounted in housing 11 by means of an upper bearing 13 and a lower bearing 14. The output end 15 of drive shaft 12 is geared to a gear train mechanism 16 containing a plurality of gears 19, 20, and 21. Gear 21 is an output gear and is connected to an output shaft 22.

The structure of motor 10 and gear train 16 finds particular use in the ice-making industry wherein the output shaft 22 of gear train 16 is connected to drive a rotatable icebreaker which breaks ice off of a freezing surface. During operation of icemakers of this type, it sometimes happens that the icebreaker will stall due to a freeze-up which will stop the rotation of output shaft 22. Because of a certain amount of play in the gears 19, 20, and 21 of gear train 16, drive shaft 12 of motor 10 will continue to rotate in a clockwise direction for several degrees of revolution, thereby putting a strain on gear train 16, and creating a reverse torque in the gears 19, 20, and 21. When motor 10 stalls, the gear train puts a reverse rotation on drive shaft 12 of motor 10, and can cause the motor to rotate in an opposite direction. This can cause an oscillation or hunting of the motor and gear train, and can cause broken shafts or ruined gear trains.

In order to prevent motor 10 from rotating in a reverse direction, an antireverse mechanism is built into the housing 11 of motor 10. This antireverse mechanism comprises a rigid stop plate 23 which has a central aperture 24 therethrough. Stop plate 23 is fixedly mounted within housing 11 by means of bolts 25, with the drive shaft 12 of motor 10 extending through the central aperture 24 of plate 23. Stop plate 23 further has a plurality of additional apertures 26 therethrough, the additional apertures 26 being radially spaced from central aperture 24, and further being circumferentially spaced around the surface of stop plate 23.

A fan blade carrier plate 27 is connected to the drive shaft 12 of motor 10 for rotation therewith, the fan blade plate being mounted inside of housing 11 of motor 10 above the rigid stop plate 23 and adjacent thereto. Fan blade carrier plate 27 has a plurality of fan blades 30 depending therefrom. Two innerly U-shaped channel members 31 are bolted through their bases 32 by means of bolts and nuts 29 to the bottom of the fan blade carrier plate 27, the channel members 31 extending generally in the direction of rotation of fan blade plate 27. In addition, channel members 31 are located above the additional apertures 26 and the stop plate 23. The sides of the U-shaped channel members 31 form a pair of ears 33 and 34 which extend downwardly from the fan blade carrier plate 27, ears 33 and 34 being parallel to and spaced from one another.

A pair of ratchet members 35, each comprise a generally vertical abutment plate 36 having upstanding side plates 37 and 38 extending outwardly and upwardly from opposite sides thereof. The extended edges 40 and 41 of each of the side plates 37 and 38, respectively, extend downwardly and toward the abutment plate 36. Therefore, the edges 40 and 41 form a camming surface for ratchet member 35 for a reason to be explained hereinafter. The upper edges 42 and 43 of each of the side plates 37 and 38, respectively, extend generally perpendicular to the plane of the abutment plate 36.

The ratchet members 35 are pivotally mounted between the ears 33 and 34 of U-shaped member 31 by means of a shaft 44. The axis of shaft 44 is generally normal to the axis of the drive shaft 12 of motor 10. In addition, shaft 44 extends through the upper portion of each of the side plates 37 and 38 such that the upper edges 42 and 43 of the side plates are closely adjacent the base 32 of the U-shaped channel members 31. Ratchet members 35 are mounted so that the side plates of the ratchets extend from the abutment plate 36 in a direction of forward, or normal, rotation of the drive shaft 12.

In operation, when the drive shaft 12 rotates, the forward or camming edges 40 and 41 of the ratchet 35 will contact a forward edge 45 of the apertures 26 in stop plate 23, and the ratchet member 35 will pivot to an upward, or carrier position wherein the ratchet 35 is out of engagement with plate 23. When the drive shaft rotates fast enough, the ratchet member 35 will be held in the carrier position by the centrifugal force developed by rotation of the drive shaft, and, too, by the pressure created by air flowing against the abutment plate 36.

Figure 3:
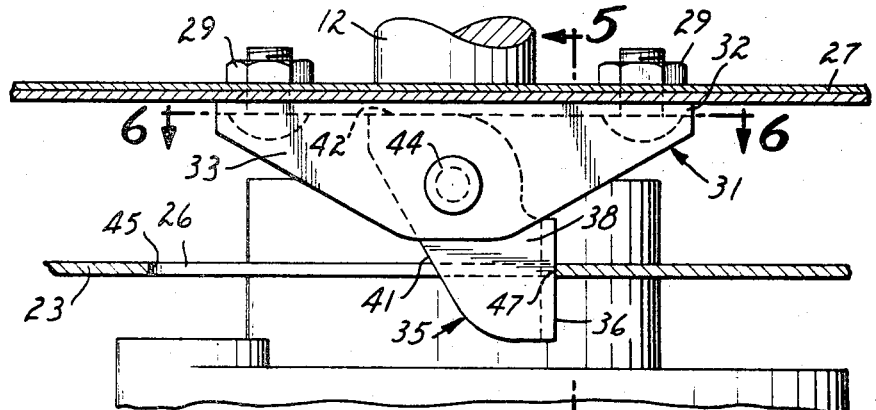
FIG. 3 is an enlarged sectional view taken along a line 3—3 of FIG. 2.
Figure 4:
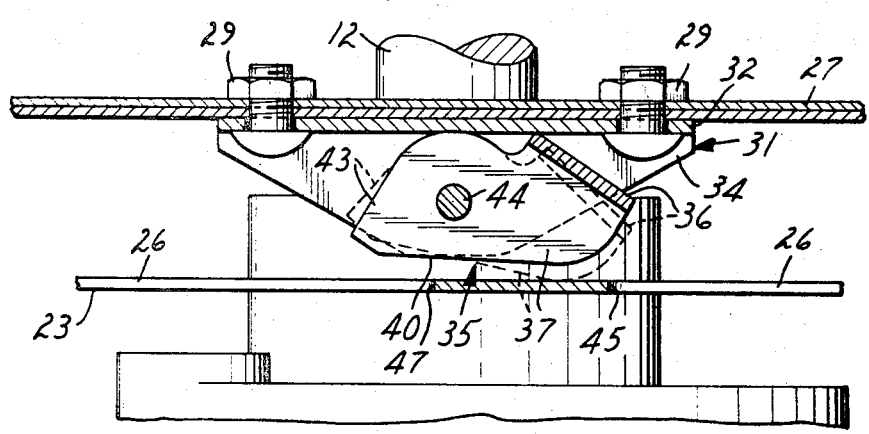
FIG. 4 is an enlarged sectional view taken along a line 4—4 of FIG. 2, and showing the ratchet member in a different position than that shown in FIG. 3.
Figure 5:
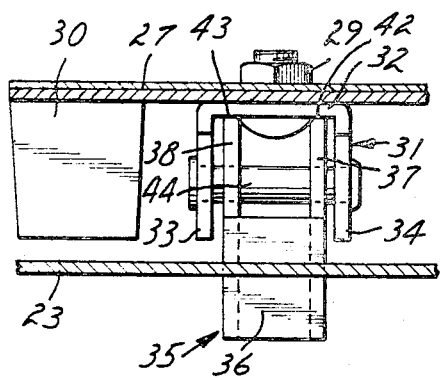
FIG. 5 is a sectional view taken along a line 5—5 of FIG. 3.
Figure 6:
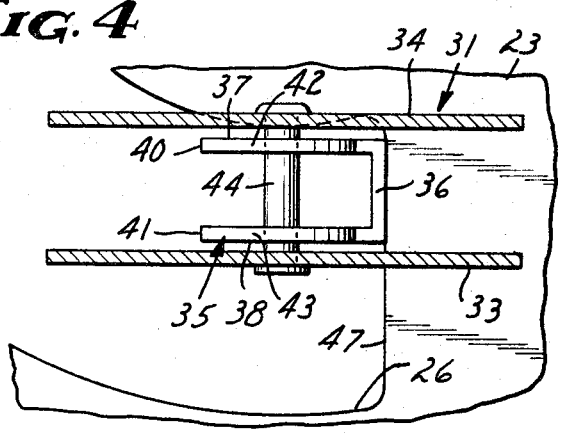
FIG. 6 is a sectional view taken along a line 6—6 of FIG. 3.

When the drive shaft 12 stops, the ratchet member 35 will pivot to an engagement position, as shown in FIG. 3, wherein the abutment plate 36 will be within one of the apertures 26. If the drive shaft 12 of motor 10 tends to rotate in a reverse direction, the abutment plate 36 of ratchet 35 will engage the edge surface 47 of the apertures 26 of stop plate 23 and prevent reverse rotation of drive shaft 12.

It will be noted that since the stop plate 23 uses a plurality of apertures 26 to form the stop or abutment surfaces for the antireverse mechanism, the cooling air flow for motor 10 through an aperture 48 in the upper end bell of housing 11 through motor 10, the apertures 26 of stop plate 23, and out an aperture 49 in the lower end bell of housing 11.

While we have shown a specific embodiment of our invention, this is for the purpose of illustration only, and our invention is to be limited solely to the scope of the appended claims.

We claim as our invention:

1. An antireverse motor comprising:
   (a) a rotatable drive shaft;
   (b) a rigid stop plate having a generally central aperture therethrough;
   (c) said stop plate being mounted in a fixed position with the drive shaft of said motor extending through the central aperture thereof;
   (d) said stop plate having at least one additional aperture therethrough radially spaced from said central aperture;
   (e) a ratchet member operatively connected to said drive shaft for rotation therewith, said ratchet member being pivotally mounted adjacent said rigid plate and adapted to move to a first position wherein said ratchet is out of engagement with said stop plate when said drive shaft rotates in a forward direction and a second position wherein said ratchet extends into said one aperture of said stop plate when said drive shaft tends to rotate in a reverse direction.

2. An antireverse motor as described in claim 1 wherein said stop plate has a plurality of additional apertures therethrough, said additional apertures being radially spaced from said central aperture and circumferentially spaced around the surface of said stop plate.

3. An antireverse motor as described in claim 2 wherein said rotatable drive shaft extends vertically within a housing and wherein said stop plate is mounted within said housing.

4. An anti-reverse motor as described in claim 3 wherein a fan blade plate is connected to said drive shaft for rotation therewith, said fan blade plate being within said housing above and adjacent to said stop plate and wherein said ratchet member is pivotally mounted to said fan blade plate and extends downwardly therefrom.

5. An antireverse motor as described in claim 4 wherein said ratchet member comprises a generally vertical abutment plate having upstanding side plates extending outwardly and upwardly from opposite sides theerof, the extended edge of each said side plates extending downwardly and toward said abutment plate and the upper edge of each said side plates extending generally perpendicular to the plane of said abutment plate.

6. An antireverse motor as described in claim 5 wherein a pair of ears are connected to said fan blade plate and extend downwardly therefrom, the planes of said ears extending generally in the direction of rotation of said fan blade plate,
- (a) said ears being parallel to and spaced from one another above said additional apertures in said stop plate, and wherein said ratchet member is pivotally mounted between said ears on an axis generally normal to said drive shaft,
- (b) said axis extending through the upper portion of each of said side plates, the side plates extending from said abutment plate in the direction of forward rotation of said drive shaft,
- (c) said abutment plate being pivotable into engagement with a portion of said stop plate defining the additional apertures when said drive shaft stops.

References Cited
UNITED STATES PATENTS

| | | | |
|---|---|---|---|
| 2,019,739 | 11/1935 | Spalding | 74—411.5 X |
| 2,072,936 | 3/1937 | Zerbe | 74—411.5 |
| 2,259,055 | 10/1941 | Zerbe et al. | 74—411.5 |
| 2,592,633 | 4/1952 | Wilson | 74—411.5 |

DONLEY J. STOCKING, *Primary Examiner.*

LEONARD H. GERIN, *Assistant Examiner.*